G. C. DOLPH.
Mower.
No. 904.
Reissued Feb. 21, 1860.
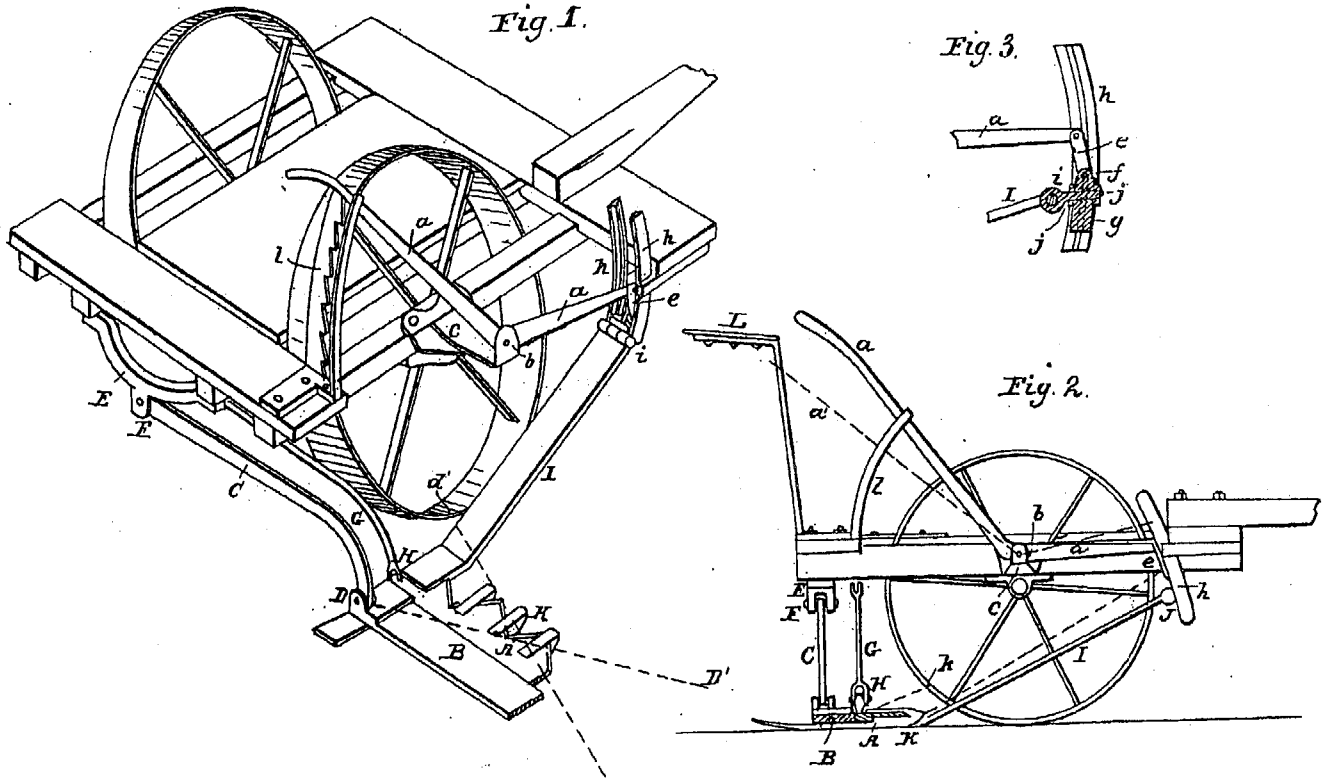
H. PETERS, Photo-Lithographer, Washington, D. C.

UNITED STATES PATENT OFFICE.

GEO. C. DOLPH, OF WEST ANDOVER, OHIO.

IMPROVEMENT IN MOWING-MACHINES.

Specification forming part of Letters Patent No. 18,141, dated September 8, 1857; Reissue No. 904, dated February 21, 1860.

*To all whom it may concern:*

Be it known that I, GEORGE C. DOLPH, of West Andover, in the county of Ashtabula and State of Ohio, have invented a new and useful Improvement in E. Ball's Mowing-Machine, for which a patent was granted June 11, 1856; and I do hereby declare that the following is a full, clear, and exact description of my invention, reference being had to the annexed drawings, making a part of this specification, in which—

Figure 1 is a perspective view of E. Ball's mowing-machine with my improvement attached; Fig. 2, a side elevation of the same; Fig. 3, a detached section of the same.

Similar letters of reference indicate corresponding parts in the several figures.

To enable those skilled in the art to fully understand and construct my invention, I will proceed to describe it.

What distinguishes my improvement in the described mower is the manner of raising and lowering or tipping the cutters and bar from K to *k*, or any intermediate position. The cutters and bar may be thus operated from the seat L, Fig. 2, or from the ground. The devices employed for this purpose consist, first, of the lever *a*, which works upon a fulcrum pivot or wrist, *b*, on the stand or bracket *c*, which bracket is fastened to the frame. To the short arm of the lever are attached by a pin-joint one or two links, *e*, Figs. 1 and 3. These links *e* are also connected by a pin-joint at *f* to the sliding box *g*. On each side of this box is a slot or gain, by means of which the box slides up and down upon the ways or guides *h h*, which are bolted to the frame. These ways form sections of a circle which is the radius described in raising and lowering the slide-box between the two guides *h h*. By the action of this lever *a* the brace-bar I is connected by a joint at *i* to the wrist *j*. This wrist passes through the slide-box *g*, in which it is allowed to turn, and is retained in place by a nut or pin, as seen in Fig. 3.

By depressing the lever *a* in the direction of the line *a'* the brace-bar, by its connection with the slide-box, will be correspondingly raised, also the cutters and cutter-bar, as indicated by the line *k*. By the raising and depressing of the lever the cutters and bar may be tipped more or less, as the nature of the case may require, and may be retained in any desired position by slipping the lever into the teeth of the rack *l*, which is attached to the frame.

Although the above-described arrangement for tipping or raising and lowering the cutter-bar and cutter may be as advantageous as any, still I do not confine myself to that arrangement. There are many ways in which an independent tipping movement may be given the cutter-bar.

Having thus described my invention, what I claim as new, and desire to secure by Letters Patent, is—

Attaching the cutter-bar B and cutter A to the front of the frame of the machine by means of a plate or bar so arranged that its front end may be raised or lowered by a lever independently of the main frame of the machine, and thus give to the cutting apparatus a tilting or rocking movement, which will elevate and lower the points of the fingers, said parts being constructed and applied to the patented machine of E. Ball, above referred to, in the manner substantially as described.

GEO. C. DOLPH.

Witnesses:
JOHN B. RICE,
M. ROBERTS.